United States Patent [19]
Carmichael et al.

[11] 4,003,279
[45] Jan. 18, 1977

[54] SHEARING TUBE STOCK

[75] Inventors: Richard Quentin Carmichael, Duxford; Roger George Bonelle, Walsall; John Edward Hartley, Royston, all of England

[73] Assignee: T. I. (Group Servies) Limited, Birmingham, England

[22] Filed: Apr. 8, 1975

[21] Appl. No.: 566,069

[30] Foreign Application Priority Data

Apr. 9, 1974 United Kingdom ............. 15603/74

[52] U.S. Cl. .................................. 83/199; 82/54; 82/58
[51] Int. Cl.² ........................................ B26D 1/00
[58] Field of Search ................ 82/58, 57, 70.2, 71, 82/75, 88, 54; 83/199

[56] References Cited
UNITED STATES PATENTS

| | | | |
|---|---|---|---|
| 480,461 | 8/1892 | Gilmore | 82/70.2 |
| 1,635,807 | 7/1927 | Amberg | 82/54 X |
| 1,657,295 | 1/1928 | Bark et al. | 82/71 |
| 2,038,255 | 4/1936 | Worthington | 82/54 X |
| 3,025,738 | 3/1962 | Winkler et al. | 82/70.2 |
| 3,494,233 | 2/1970 | Kojima | 83/199 |

FOREIGN PATENTS OR APPLICATIONS 749,389   5/1956   United Kingdom ................ 82/58

*Primary Examiner*—Leonidas Vlachos
*Attorney, Agent, or Firm*—Scrivener Parker Scrivener and Clarke

[57] ABSTRACT

A method of orbital shearing of elongated stock such as tube stock comprises passing the stock through aligned dies, then causing relative lateral displacement, arcuate or linear, between the axes of dies, and causing a relative orbital movement between one die and the stock held in the other die. The lateral movement causes partial shearing, which is propagated around the stock by the orbital movement. One die may be fixed, while the other performs both the lateral and then the orbital movement. The stock may be rotated, in which case the moving die only has to move laterally to achieve the orbital movement as well.

5 Claims, 6 Drawing Figures

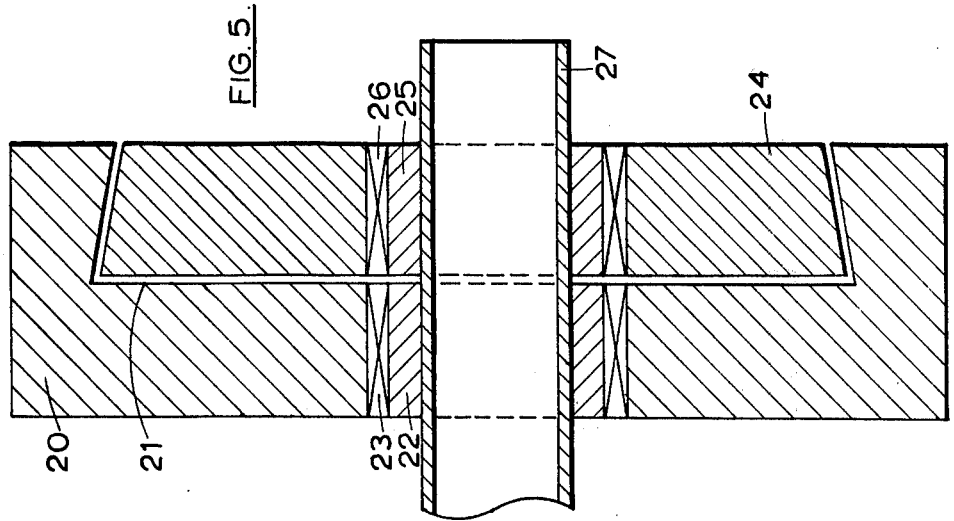
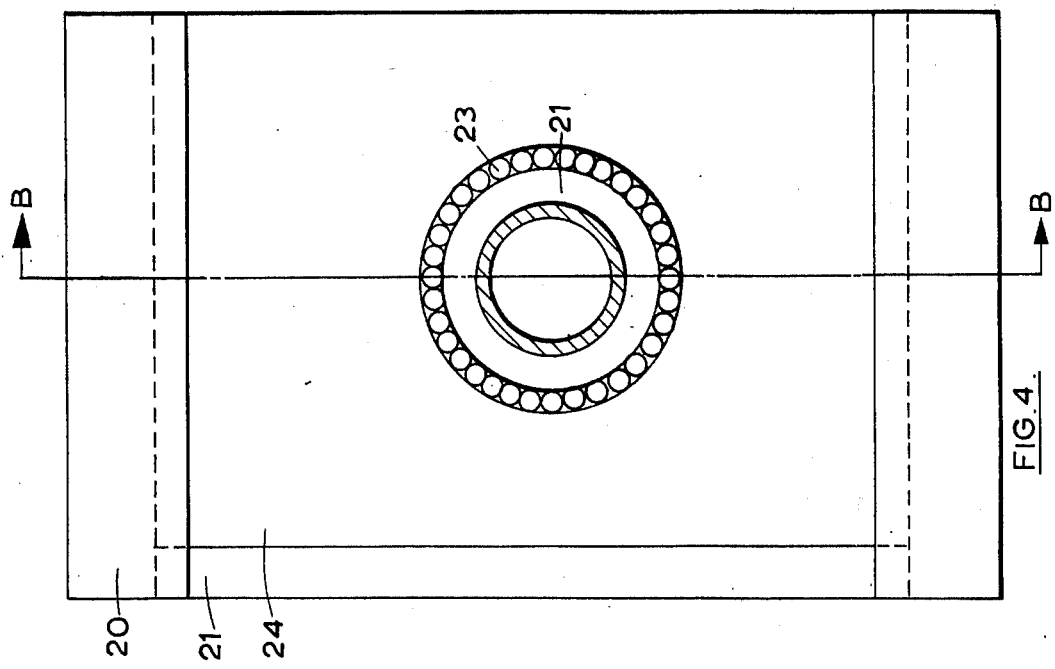

SHEARING TUBE STOCK

This invention relates to the shearing of elongated stock by the use of apertured dies, one of which moves in an orbital path with respect to the stock in the other. It is primarily of use in the shearing of hollow sections, especially of tube.

One known method of shearing tube is by the use of two apertured dies, initially aligned, one of which is displaced linearly with respect to the other at right angles to the axis of the stock. This is satisfactory in some situations but, even if the bore of the tube is supported by a mandrel, the cut end of the tube is distorted, especially where the presence of a weld bead in a seam-welded tube prevents the use of a very close fitting mandrel.

It has been proposed to displace the movable die in an eccentric path rather than a linear path, that is to say through a circular or arcuate motion about a point which is eccentric with respect to the axis of the tube, but this suffers from the same drawback of causing different degrees of shearing action, and therefore distortion, at different points around the circumference of the tube.

It has been proposed in the U.S. Pat. No. 3,494,233 to Kojima to hold the tube stock in one apertured die and to mount the other apertured die rotatably in a double eccentric arrangement, of which the outer member is co-axial with the axis of the tube. Initially the two eccentrics have a relative angular disposition such that their eccentricities cancel each other out, and the tube is inserted with the eccentrics in this position, the two dies then being in alignment. Then the eccentric assembly is rotated at a high speed about the axis of the tube. While the eccentrics are rotating thus, a relative rotation is caused between the two eccentrics, making the die carried by the inner one increasingly eccentric with respect to the axis of the tube. This causes a progressive shearing action around the tube, and the shearing is complete when, or before, the eccentricity has attained a value equal to the wall thickness of the tube.

A drawback of this arrangement is that the shearing action takes place only slowly. It can be shown that in metals a slow shearing rate is often undesirable, since it can lead to unnecessary distortion of the cut edges, and for this reason it is known to develop methods of shearing, for example of steel plate, where the shear rate is high.

Another drawback of such an arrangement is the practical difficulty of causing controlled relative rotation between the two eccentrics when they are rotating as a whole at high speed.

The primary aim of the present invention is to provide a method of orbital shearing that avoids these disadvantages.

According to the present invention we propose to shear the elongated stock using a pair of apertured dies, the apertures in the dies being of a size corresponding to the stock and the apertures in the dies having mutually parallel axes, by first aligning the apertures in the dies, then causing the tube to protrude through the apertures with its axis aligned with the axes of the apertures, displacing one of the dies laterally relative to the axis of the aperture in the other die and causing relative orbital movement between the aperture in one of the dies and the stock in the other die.

By the method according to the invention, it is possible to make a rapid localised shearing cut that takes place over only a limited arcuate portion of the workpiece and then, by the orbital movement, to propagate that cut around the circumference of the workpiece. The lateral displacement that causes the initial cut will be of an amplitude which, in the case of a tube or other hollow section, need only be equal to or rather less than the wall thickness of the workpiece; the actual amount will depend on the ductility and other characteristics of the material of the workpiece but should be chosen to be no more than necessary to cause the initial cut over a minimum arc, as will become clear from the description which follows.

The tube may be fixed against rotation or may rotate. Where the tube rotates it is only necessary to arrange for the movable die to move to provide the radial displacement and the relative orbital movement is brought about by rotating the tube in the displaced dies.

Some embodiments of the invention will now be described by way of example, with reference to the accompanying drawings, in which FIG. 1 is a diagrammatic section through a tube, used to illustrate the principle behind the invention;

FIG. 4 is a view, similar to FIG. 1, of another form of shearing machine embodying the invention;

FIG. 5 is a section on line B—B in FIG. 4; and

Figure 1:
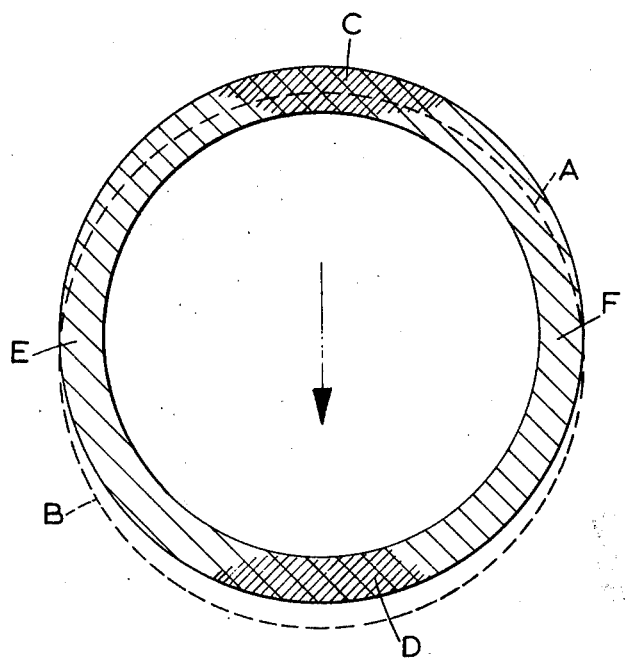

In FIG. 1 there is illustrated at A a section through a metal tube of round cross-section. For shearing, this tube is received in an aperture in a stationary die (not shown) and has a mandrel (not shown) inside it. The aperture should conform to the shape and size of the stock with a small clearance to allow easy feeding of the stock but need not be by any means a very close fit. The circular dotted line B shows the position of the moving die after partial lateral displacement in the direction of the arrow in the method according to the invention. In the regions designated C and D the displacement has caused the metal to be sheared completely through. However in the regions designated E and F the metal has not sheared, because the relative displacement between the dies has been insufficient in relation to the thickness of metal in the direction of movement. The regions in which shearing has taken place are shown cross-hatched.

Subsequent relative orbital movement between the dies (i.e. relative movement so that the axis of the aperture in one die moves in a complete circle around the axis of the aperture in the other die) will cause the cut to be propagated around the tube, again at a high shear rate. In fact it will be appreciated that, as the initial cut takes place at two diametrically opposed points, orbital movement through only 180° would be enough, although it will be clear, from the description of practical embodiments which follows, that in practice it is easier to perform the full 360° movement.

The amplitude of the displacement in FIG. 1 is shown as being about half the wall thickness of the tube. In practice it may be more, depending on the ductility of the material of the tube and may even be equal to the wall thickness; it should basically be only the minimum necessary to cause complete shearing over a minimum arc, which in practice may extend about 30°.

Figure 3:
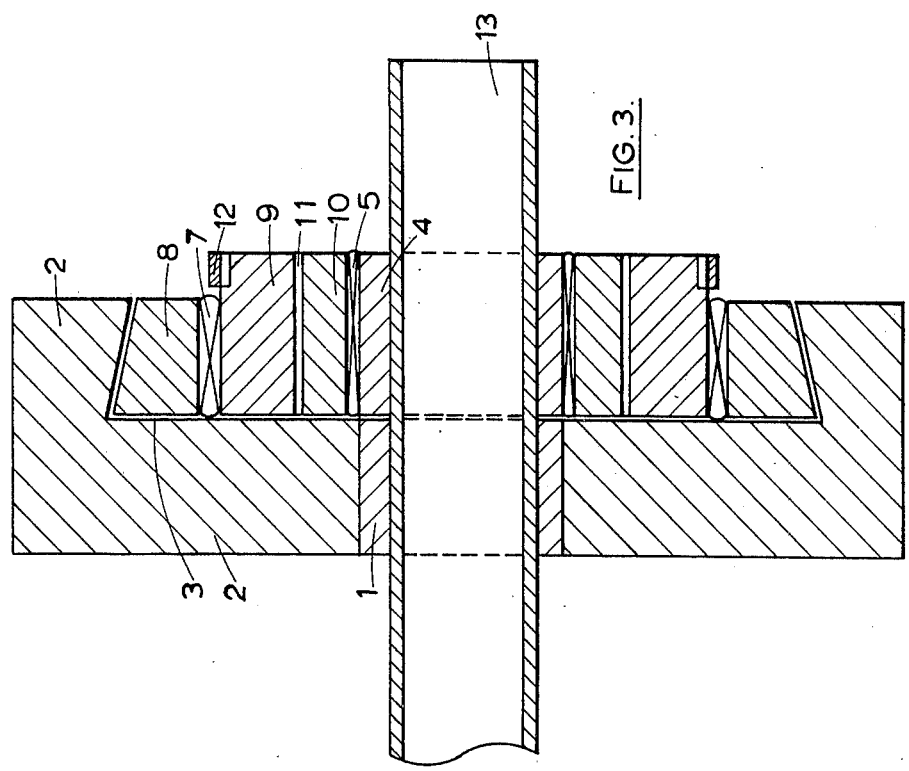
FIG. 3 is a section on line A—A in FIG. 2.
Figure 2:
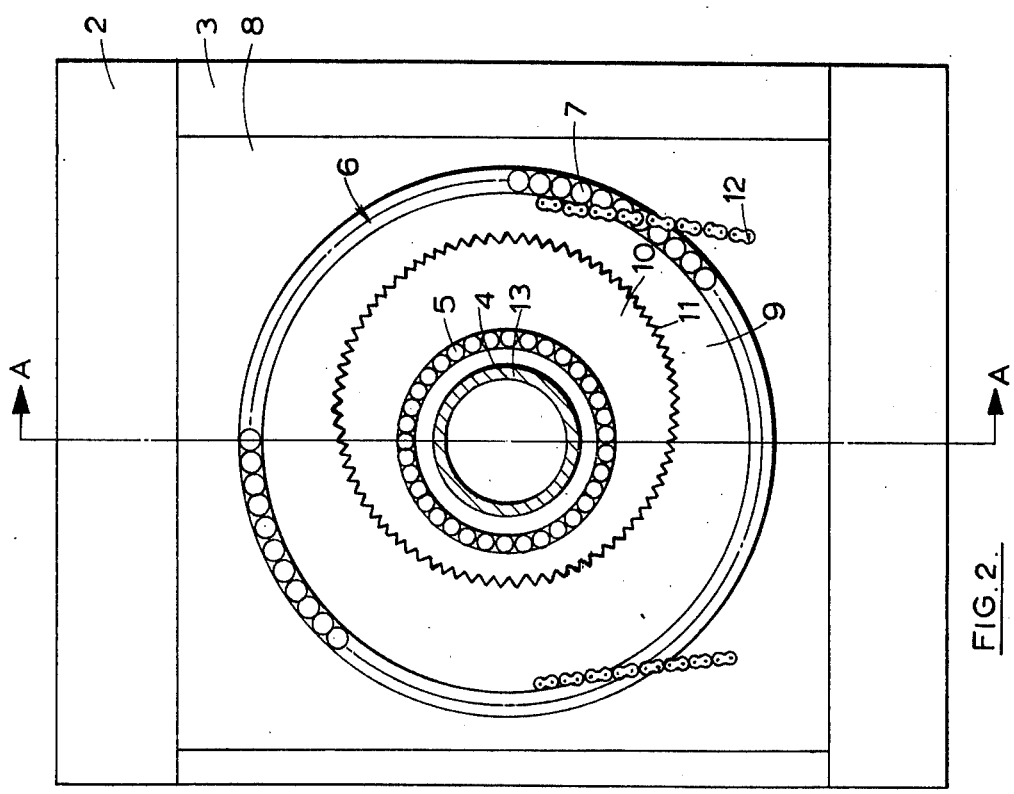
FIG. 2 is a view, looking along the axis of the tube to be sheared, of a shearing machine embodying the invention.

A machine shown diagrammatically in FIGS. 2 and 3 for carrying out the invention comprises a fixed die assembly 1 in the form of a hardened annulus mounted in a die holder 2 in the form of a block with a dovetail groove 3 formed in one face. The die is mounted in a circular aperture in the die holder, which aperture extends through the centre of the block with its axis perpendicular to the direction in which the groove extends. A movable die 4, also in the form of a hardened annulus, is rotatably mounted by way of a roller bearing 5 in a compound circular die holder 6. The die holder 6 is itself rotatably mounted by way of a roller bearing 7 in a slide block 8 carried in the dovetail groove 3. The axes of the movable die 4 and its holder 6 are parallel to the axis of the fixed die 1, and the movable die 4 and its holder 6 are bodily movable on the slide laterally, that is in a direction perpendicular to the various parallel axes. It will be understood that the drawings are diagrammatic and that refinements such as provisions for adjustment and for taking axial thrust between the various components have been omitted in the interests of clarity.

The movable die holder 6 comprises a double eccentric having an outer eccentric 9 in the form of a disc with an eccentric hole in it into which is fitted an inner eccentric 10 also in the form of a disc with an eccentric hole. The inner eccentric 10 is locked against rotation in the outer eccentric 9 by splines 11. The die 4 is carried in the hole in the inner eccentric 10. Thus the die 4 is eccentrically mounted in its holder 6, and by varying the relative angular disposition of the two eccentrics 9, 10 the effective eccentricity can be varied between zero and the sum of the two eccentricities. (The eccentricity is shown set at zero in FIG. 2). It will be understood that this is an adjustment which is preset and locked before a shearing operation and there is no variation of eccentricity during shearing. The pre-set variation in eccentricity allows the shearing machine to be set to give the minimum displacement necessary for different thicknesses of tube.

Where the workpiece is a tube or other hollow section (it need not be round and it need not be a closed section) it generally needs to be supported by a mandrel within. This mandrel can be of a known kind comprising two sections meeting at the shearing plane and relatively movable laterally but urged axially together, for example by an internal spring. An advantage of the invention, in which the relative displacement can be equal to or less than the wall thickness of the tube, is that even if the mandrel is incorrectly placed axially, so that the joint between its sections is not truly in the shearing plane, the moving die cannot engage and damage the mandrel.

The mandrel may be of an expanding kind.

The rotatable die holder 6 projects from the slide block 8 and that part of its outer peripheral face which projects beyond the block 8 is toothed for co-operation with a chain 12 connected to suitable drive means (not shown). Linear movement of the slide 8 is brought about by a pneumatic or hydraulic ram (not shown) and the slide is movable between two end positions determined by limit stops (not shown), in one of which positions the two dies 1 and 4 are aligned and in the other of which the movable die 4 is eccentric by the desired amount. The stop which sets the second position of the movable die, i.e. the position in which its axis of rotation coincides with the axis of the aperture in the fixed die is fixed; it is the other stop, the one that sets the position necessary to bring the two apertures into line for insertion of the tube, that is moved to match the displacement that is itself pre-set to suit the wall thickness of the tube.

At the start of a shearing operation the movable die 4 is stopped with its eccentricity aligned with the direction of movement of the slide 8 and with the centre of its aperture diametrically opposite the direction in which the slide can move. The slide is then moved to bring the aperture of the movable die 4 into alignment with the aperture of the fixed die and tube 13 can be inserted.

Then the ram is actuated to move the slide 8 to the other end of its travel, so that the axis of rotation of the movable die 4 (but not the axis of the aperture in it) is brought back into coincidence with the axis of the tube. This causes a shearing action over two small arcs as described with reference to FIG. 1. Thereupon, the movable die 4 is rotated through 360°, so propagating the shearing action all round the circumference of the tube 13.

Alternatively, the movable die may be rotated through multiples of 360°. This may allow a smaller eccentricity to be employed. As a further alternative the orbital shearing movement could be completed in only 180°, giving a faster cycle time but additional complexity as the die then needs to move in opposite directions to get back to the starting position from the orbital shearing position for alternate cycles.

In some other embodiments of the invention we propose that the stock should itself be rotated while extending through a pair of apertured dies (which may also rotate with the stock). One such machine is shown in FIGS. 4 and 5. The machine comprises a fixed die holder 20 in the form of a block with a dovetail groove 21 in one face with an aperture extending through the block similar to the die holder 2 shown in FIGS. 2 and 3. However the die 22 which is formed as a hardened annulus is rotatably mounted in the aperture by a roller bearing 23. A slide 24 forming a movable die holder is mounted in the groove for lateral movement relative to the fixed die 22. A movable die 25 which is similar to the die 22 is mounted for rotation by way of a roller bearing 26 in an aperture in the slide 24. The dies are positioned in their holders so that in one position of the slide 24 in the groove 21 they are aligned with each other so that a length of tube 27 can be inserted in them.

Means are provided to rotate a tube in the shearing machine. Also means such as a hydraulic or pneumatic ram are provided to move the slide between two limit positions, one in which the dies are aligned and the other in which the dies are offset by a distance which may be adjustable to cater for tubes of different wall thicknesses.

In operation the dies 22, 25 are aligned, the tube inserted and then the tube is rotated and the slide moved to offset the dies. Since the tube is rotating continuously, this linear movement results in a progressive orbital shearing of the tube stock. The movement is preferably fast, in fact so fast that the total lateral displacement of the die takes place during the first few degrees of one revolution of the tube. In the latter case the shearing action is completed in one revolution or even only a half revolution but is still a truly orbital shearing, overcoming the problems associated with linear or eccentric shearing.

The apparatus of FIGS. 4 and 5, in which the stock rotates, makes available the possibility of introducing the eccentricity slowly, possibly spread over many complete revolutions of the stock; this loses the advantage of the initial quick shear followed by progressive circumferential propagation of the cut, but it may be acceptable, or even desirable, where some distortion of the end of the stock is wanted.

Figure 6:
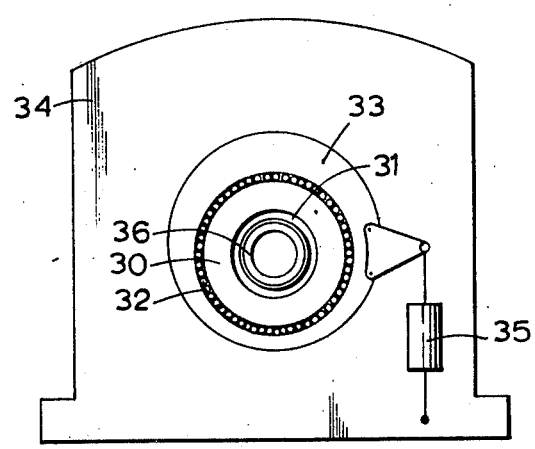
FIG. 6 is an elevation, looking along the axis, of a third form of shearing machine embodying the invention.

An alternative form of shearing machine in which the stock is rotated is shown in FIG. 6. This embodiment is similar in operation to that shown in FIGS. 4 and 5 except that the linear offsetting movement is replaced by an arcuate movement brought about by mounting the movable die in an eccentric. In FIG. 6 a fixed die (not visible), with a hardened insert, is rotatably mounted by way of bearings in a fixed holder and a movable die 30 having a hardened insert 31 is rotatably mounted by way of bearings 32 in an aperture in an eccentric holder 33 which is rotatable in a fixed housing 34. Rotation of the eccentric 33 is controlled by a pneumatic or hydraulic ram 35 acting between the housing 34 39 and the eccentric.

The eccentricity of the eccentric 33 determines the total displacement of the movable die 30 for a given angular movement of the eccentric. To cater for tubes of different wall thicknesses the eccentric can be rotated through any pre-set angle up to 180°.

The tube, shown at 36, is inserted with the apertures in the fixed and moving dies in alignment. Then the ram 35 is actuated to turn the eccentric through a fixed amount to cause partial shearing of the tube, and then either simultaneoulsy or subsequently the tube is rotated, by means not shown, carrying with it the die 30 which turns in the bearings 32.

In a modification of the embodiment shown in FIG. 6 the eccentric 33 is itself mounted in a second eccentric to form a double eccentric assembly, allowing the overall effective eccentricity of the assembly to be altered to suit tubes of different wall thickness while allowing the angular movement required in each shearing cycle to be fixed at 360°. It will be noted that, unlike the double eccentric of the known arrangement, it only requires relative adjustment of the inner and outer eccentrics when changing from one stock size to another.

Any of the versions described may be used, if desired, in double form, that is to say, with a moving die sandwiched between two fixed dies so that the stock is sheared at two axially spaced points simultaneously. This may be useful where the stock is to be cut into short lengths of fixed value.

We claim:

1. The method of shearing elongated stock by use of respective fixed and moveable apertured dies, the apertures of said dies corresponding in size to the stock, said moveable die being rotatably carried on an adjustable eccentric rotatably mounted on a non-rotatable linearly and laterally moveable slide block comprising the steps of presetting with a fixed eccentricity the eccentric on said slide block so that the axis of said moveable die is displaced a preset fixed distance from the axis of said eccentric, aligning the aperture in said moveable die with the aperture in said fixed die by moving said slide block laterally and linearly to a first position at which the axes of the apertures of said dies are coincident, inserting said stock through the aligned apertures of said dies, partially shearing said stock by moving said slide block laterally and linearly to a second position wherein the axis of said moveable die is laterally displaced relative to the axis of said fixed die, and thereafter rotating said eccentric to cause said moveable die to follow an orbital path relative to said fixed die and propagate said shearing around said stock.

2. The method of claim 1 wherein said stock is hollow stock and including the step of inserting a mandrel in said stock prior to said lateral displacement and orbital movement.

3. The method set forth in claim 1 as applied to tube stock having a uniform wall thickness, wherein the relative displacement of the axes of said moveable and fixed dies is not greater than said wall thickness.

4. Apparatus for shearing elongated stock comprising a first fixed apertured die and a second moveable apertured die, the apertures in said dies corresponding in size to stock to be sheared, means for displacing said moveable die laterally and linearly relative to said fixed die comprising a laterally and linearly moveable slide block, an eccentric rotatably mounted on said slide block, said moveable die being rotatably mounted on said eccentric with its axis parallel to the axis of said eccentric, means for adjustably displacing the axis of said moveable die a preset fixed distance laterally of the axis of said eccentric, said slide block being linearly and laterally moveable in a direction normal to all of said axes between a first position in which the axes of said fixed and moveable dies are coincident and a second position in which said axes are relatively laterally displaced, and means for rotating said eccentric on said slide block after said slide block has been moved to its second position to cause said moveable die to follow an orbital path relative to said fixed die.

5. Apparatus is set forth in claim 4 wherein the means for adjusting the axis of said moveable die comprises a second eccentric rotatable but lockable within said first mentioned eccentric, said eccentrics having axes parallel to each other, and said moveable die being rotatably mounted on said second eccentric.

* * * * *